United States Patent
Djordjevic et al.

(10) Patent No.: US 9,184,873 B2
(45) Date of Patent: Nov. 10, 2015

(54) ULTRA-HIGH-SPEED OPTICAL TRANSPORT BASED ON ADAPTIVE LDPC-CODED MULTIDIMENSIONAL SPATIAL-SPECTRAL SCHEME AND ORTHOGONAL PROLATE SPHEROIDAL WAVE FUNCTIONS

(71) Applicant: NEC Laboratories America, Inc., Princeton, NJ (US)

(72) Inventors: Ivan B Djordjevic, Tuscon, AZ (US); Ting Wang, West Windsor, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 108 days.

(21) Appl. No.: 14/218,116

(22) Filed: Mar. 18, 2014

(65) Prior Publication Data
US 2014/0270759 A1 Sep. 18, 2014

Related U.S. Application Data

(60) Provisional application No. 61/802,794, filed on Mar. 18, 2013.

(51) Int. Cl.
*H04J 14/02* (2006.01)
*H04L 1/00* (2006.01)
(Continued)

(52) U.S. Cl.
CPC .......... *H04L 1/0043* (2013.01); *H04B 10/2581* (2013.01); *H04B 10/5161* (2013.01); *H04B 10/61* (2013.01); *H04J 14/06* (2013.01);
(Continued)

(58) Field of Classification Search
CPC ........ H04J 14/00; H04J 14/002; H04J 14/04; H04J 14/06; H04J 2203/0089; H04J 2211/00; H04B 10/516; H04B 10/2581; H04B 10/5161; H04B 10/61
USPC ............. 398/44, 65, 74, 76–79, 89, 142, 143, 398/183–185, 187, 188, 202–205
See application file for complete search history.

(56) References Cited

U.S. PATENT DOCUMENTS

| 2013/0089326 A1* | 4/2013 | Djordjevic | H04J 14/04 398/44 |
| 2013/0091398 A1* | 4/2013 | Djordjevic | H04J 14/06 714/752 |

(Continued)

OTHER PUBLICATIONS

Winzer, P. "Beyond 100G Ethernet," IEEE Communications Magazine, vol. 48, Jul. 2010, pp. 26-30.
(Continued)

*Primary Examiner* — Li Liu
(74) *Attorney, Agent, or Firm* — Joseph Kolodka

(57) ABSTRACT

Systems and methods for transmitting data, including encoding one or more streams of input data using one or more adaptive Low Density Parity Check (LDPC) encoders, wherein the encoders generate one or more signal constellations; modulate one or more signals using hybrid multidimensional coded modulation; apply orthogonal prolate spheroidal wave functions as electrical basis functions; generate one or more spectral band group signals by selecting and combining two or more spectral band groups with center frequencies that are orthogonal to each other; and spectral-mode-multiplex and transmit the one or more adaptive LDPC-coded data streams including the one or more spectral band group signals combined into corresponding spatial modes over a transmission medium.

20 Claims, 7 Drawing Sheets

(51) Int. Cl.
  *H04J 14/06* (2006.01)
  *H04B 10/2581* (2013.01)
  *H04B 10/516* (2013.01)
  *H04B 10/61* (2013.01)
  *H04J 14/04* (2006.01)

(52) U.S. Cl.
  CPC .............. *H04L1/005* (2013.01); *H04L 1/0041* (2013.01); *H04L 1/0058* (2013.01); *H04L 1/0061* (2013.01); *H04J 14/04* (2013.01); *H04J 2203/0089* (2013.01); *H04J 2211/00* (2013.01); *H04L 1/0002* (2013.01)

(56) References Cited

U.S. PATENT DOCUMENTS

| | | | | |
|---|---|---|---|---|
| 2013/0148963 A1* | 6/2013 | Cvijetic | ................... | H04J 14/04 398/45 |
| 2014/0101512 A1* | 4/2014 | Djordjevic | ........ | H03M 13/1148 714/758 |
| 2014/0219653 A1* | 8/2014 | Djordjevic | .............. | H04J 14/06 398/44 |

OTHER PUBLICATIONS

Djordjevic, I.B., "Spatial-Domain-Based Hybrid Multidimensional Coded-Modulation Schemes Enabling Multi-Tb/s Optical Transport," Journal of Lightwave Technology, vol. 30, No. 14, Jul. 2012, pp. 2315-2328.

Djordjevic, et al., "Generalized OFMD (GOFDM) for Ultra-High-Speed Optical Transmission," Optical Express, vol. 19, No. 7, Mar. 2011, pp. 6969-6979.

Michael, et al., "Multiple Pulse Generator for Ultra-Wideband Communication Using Hermite Polynomial Based Orthogonal Pulses," IEEE Conference on Ultra Wideband Systems and Technologies, May 2002 pp. 47-51.

Dunham, J., "Annals of Mathematics," Annals of Mathematics, Second Series, vol. 39, No. 2, Apr. 1938, pp. 262-268.

Liu, et al., "On the Optimum Signal Constellation Design for High-Speed Optical Transport Networks," Optics Express, vol. 20, No. 18, Aug. 2012, pp. 20396-20406.

He, et al., "Comparison of Various Bandwidth-Efficient LDPC Coding Schemes for Tb/s Superchannel Long-haul Transmission," OFC/NFOEC Technical Digest, Mar. 2012, 2 pages.

Van Assche, "Orthogonal Polynomials in the Complex Plane and on the Real Line," Fields Institute Communications, 1997 vol. 14, pp. 211-245.

Zou, et al., "LDPC-Coded Mode-Multiplexed CO-OFDM Over 1000 km of Few-Mode Fiber," CLEO Technical Digest, May 2012, 2 pages.

* cited by examiner

ULTRA-HIGH-SPEED OPTICAL TRANSPORT BASED ON ADAPTIVE LDPC-CODED MULTIDIMENSIONAL SPATIAL-SPECTRAL SCHEME AND ORTHOGONAL PROLATE SPHEROIDAL WAVE FUNCTIONS

RELATED APPLICATION INFORMATION

This application claims priority to provisional application Ser. No. 61/802,794 filed on Mar. 18, 2013, incorporated herein by reference.

BACKGROUND

1. Technical Field

The present invention relates to coded modulation, and in particular, to systems and methods for hybrid multidimensional coded-modulation employing orthogonal prolate spheroidal wave functions.

2. Description of the Related Art

As the response to never ending demands for higher data rates and distance independent connectivity, 100 Gb/s Ethernet (GbE) standard has been already adopted, and 400 GbE and 1 TbE have become the research focus of many researchers. IEEE recently ratified the 40/100 GbE standard IEEE 802.3ba. As the operating symbol rates increase, the deteriorating effects of fiber nonlinearities and polarization-mode dispersion (PMD) reach levels that inhibit reliable communication over the optical fiber network.

High speed (e.g., Terabit) optical Ethernet technologies may be affected by the limited bandwidth of information-infrastructure, high energy consumption, and heterogeneity of optical networking infrastructure, for example. Furthermore, in the context of high-speed optical communication systems, not only the error correction performance but also the complexity of a coded modulation system plays a crucial role. To reach ultra-high-speed transport rates (e.g., beyond 1 Tb/s serial date rates, extremely large signal constellation sizes are currently required for polarization-division multiplexed (PDM) single-carrier QAM systems, with commercially available symbol rates.

SUMMARY

A method for transmitting data, comprising encoding one or more streams of input data using one or more adaptive Low Density Parity Check (LDPC) encoders, wherein the encoders generating one or more signal constellations; modulating one or more signals using hybrid multidimensional coded modulation; applying orthogonal prolate spheroidal wave functions as electrical basis functions; generating one or more spectral band group signals by selecting and combining two or more spectral band groups with center frequencies that are orthogonal to each other; and spectral-mode-multiplexing and transmitting the one or more adaptive LDPC-coded data streams including the one or more spectral band group signals combined into corresponding spatial modes over a transmission medium.

A system for transmitting data, comprising one or more adaptive Low Density Parity Check (LDPC) encoders configured to encode one or more streams of input data; a signal constellation generation module configured to generate one or more signal constellations; one or more modulators configured to generate one or more signals using hybrid multidimensional coded modulation; an orthogonal prolate spheroid wave function generation module configured to generate orthogonal prolate spheroid wave functions for use as electrical basis functions; a spectral band group signal generation module configured to generate one or more spectral band group signals by selecting and combining two or more spectral band groups with center frequencies that are orthogonal to each other; and one or more spectral-mode-multiplexers and transmitters configured to spectral-mode-multiplex and transmit one or more adaptive LDPC-coded data streams including the one or more spectral band group signals over a transmission medium.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
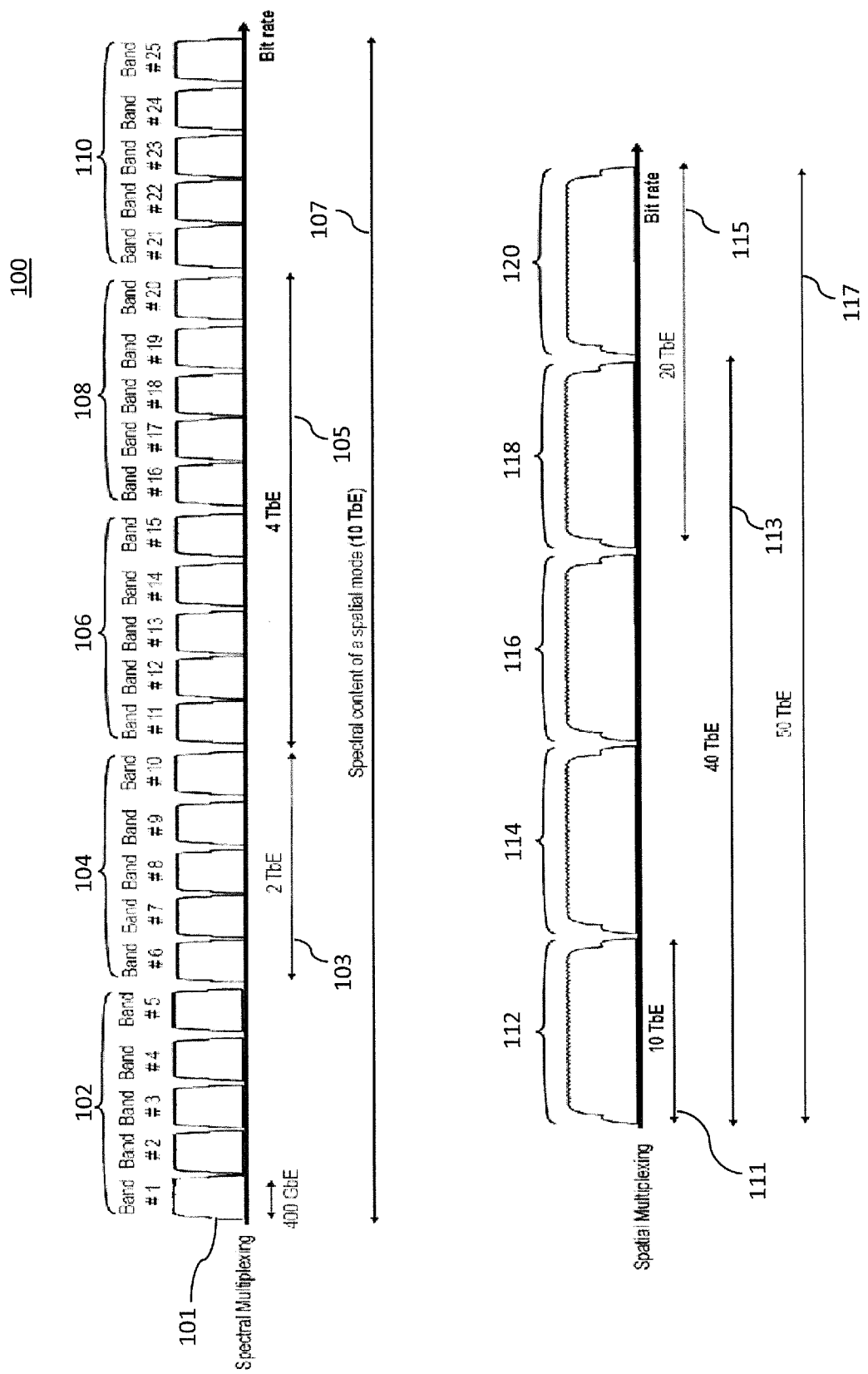
FIG. 1 shows a block/flow diagram illustrating a system/method of spectral-spatial processing enabling ultra-high-speed serial optical transport according to the present principles.

To solve problems associated with ultra-high speed (e.g., Terabit and beyond) optical Ethernet technologies (characterized by, for example, limited bandwidth of information infrastructure, high energy consumption, heterogeneity of optical networking infrastructure, etc.), an adaptive software-defined low density parity check (LDPC) coded multiband modulation system and method including spatial-multiple-input and multiple-output (MIMO) and an all-optical orthogonal frequency division multiplexing (OFDM) method may be employed according to the present principles to provide both fine granularity and elastic approach to bandwidth utilization.

The modulation may be based on multidimensional signaling to improve the tolerance to fiber nonlinearities and imperfect compensation of channel impairments. One embodiment according to the present principles may employ hybrid (e.g., electrical and optical) degrees of freedom. Optical degrees of freedom may include, for example, spatial and polarization modes in few-mode fibers. The electrical degrees of freedom may be based on 2M orthogonal prolate spheroidal wave functions, which may be used as basis functions for 2M-dimensional signaling. The adaptive coding may be performed by partial reconfiguration of the corresponding parity-check matrix. The system and method according to the present principles enable the conveyance of data over optical fibers supporting a multitude of spatial modes to enable ultra-high-speed data transmission rates (e.g., 10+ Tb/s bit rates).

Terabit optical Ethernet technologies are affected by the limited bandwidth of information infrastructure, high energy consumption, and heterogeneity of optical networks. In one embodiment, hybrid multidimensional coded modulation (CM), employing both electrical and optical degrees of freedom, is employed to address above constraints in a simultaneous manner. The optical degrees of freedom may include the polarization and spatial modes in, for example, few-mode fibers (FMFs) and few core fibers (FCF). The use of multidimensional signaling brings several advantages as compared to the conventional polarization-division multiplexed polarization division multiplexed (PDM) quadrature amplitude modulation (QAM) including the following: (i) the Euclidean distance among signal constellation points for the same symbol energy can be increased as compared to 2-D constellations, and (ii) the nonlinear polarization mode dispersion (PMD) effects in single mode fibers (SMF) applications and nonlinear interaction among spatial modes in FMFs can be compensated for by LDPC-coded turbo equalization.

To address the constraint of heterogeneity in optical networks, simultaneous rate adaptation and signal constellation size selection may be employed to optimize the channel capacity of a transmission link according to the present principles. Therefore, to meet a target bit-error-rate (BER) requirement the error correction strength may be dynamically adjusted based on the optical channel conditions. To enable ultra-high-speed (e.g., 10+ Tb/s) serial optical transport, the adaptive software-defined LDPC-coded multidimensional scheme according to the present principles may be used in combination with spectral-spatial multiplexing in a MIMO fashion. In one embodiment, the multidimensional signal constellations may also be used in combination with quasi-cyclic (QC)-LDPC codes.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a block/flow diagram illustrating a system/method of spectral-spatial processing enabling ultra-high-speed serial optical transport 100 is illustratively depicted according to the present principles. In one embodiment, an adaptive software-defined low density parity check (LDPC)-coded multiband all-optical orthogonal frequency division multiplexed system/method with spatial-multiple-input and multiple-output (MIMO) for ultra-high-speed data transport for spectral-spatial processing enabling up to 50 Tb/s serial optical transport 100 is illustratively depicted according to the present principles.

In one embodiment, the framework is flexible and can support various Ethernet rates (e.g., 10 Tb/s and beyond). The scheme may be organized into five band-groups 102, 104, 106, 108, 110 with center frequencies being orthogonal to each other. Each spectral component 101 may carry, for example, 400 Gb Ethernet (400 GbE), while each spectral group 103 may carry, for example, 2 TbE traffic. A three-step hierarchical architecture may be employed, and may include as a building block, for example, 400 Gb/s signals originating either from 4×100 GbE channels, 10×40 GbE, or one 400 GbE channel, respectively. Also, several optical subcarriers of an all-optical OFDM method may be employed to create a super channel structure.

In one embodiment, 400 GbE spectral slots may arranged in spectral band-groups 102, 104, 106, 108, 110 to enable 2 Tb Ethernet. By combining two spectral band-groups 105, the method can enable 4 TbE. It is noted that the method according to the present principles is scalable, and although a maximum of 5 spectral band groups 107 are illustratively depicted, any number of spectral band groups may be aligned along the optical spectrum as content of the spatial mode to enable even higher speed transport according to the present principles.

In one embodiment, a second layer employs spectral-division multiplexing, and may result in 10 Tb/s aggregate data rate 111 per spatial mode 112, 114, 116, 118, 120 (e.g., corresponding to 10 TbE). By combining two (or four) spatial modes, the method is compatible with a plurality of Ethernet speeds, including, for example, 20 Tb (40 Tb) Ethernet speeds 115, 113. A fiber link layer may be implemented by combining the signals from spatial modes to achieve 50 TbE optical transmissions 117 according to the present principles.

In one embodiment, band selection within a band group 105 may be performed by complex multiplication of corresponding spectral band with a $\exp(j2\pi f_n t)$ term, where $f_n$ is the center frequency of the n-th band in band-group. Such obtained signals are initially spectrally-multiplexed to create the spectral band group. The all-optical OFDM approach may be used for spectral-multiplexing. In another embodiment, the spectral multiplexing can be achieved by the complex multiplication of corresponding 2M-dimensional signals by $\exp[j2\pi(f_c+f_n)t)]$, where $f_c$ is the central frequency of the c-th spectral band group and a power coupler. The corresponding spectral band-group signals may then be coupled into few-mode-fiber (FMF) by a mode-multiplexer. To facilitate the demodulation process, the central frequencies of bands within the band-group, as well as among the band-groups, are chosen so that the principle of orthogonality is satisfied.

While the above illustration represents one of a plurality of the possible combinations, other combinations are contemplated as there is high degree of flexibility of how the spectral-spatial arrangement is implemented.

Figure 2:
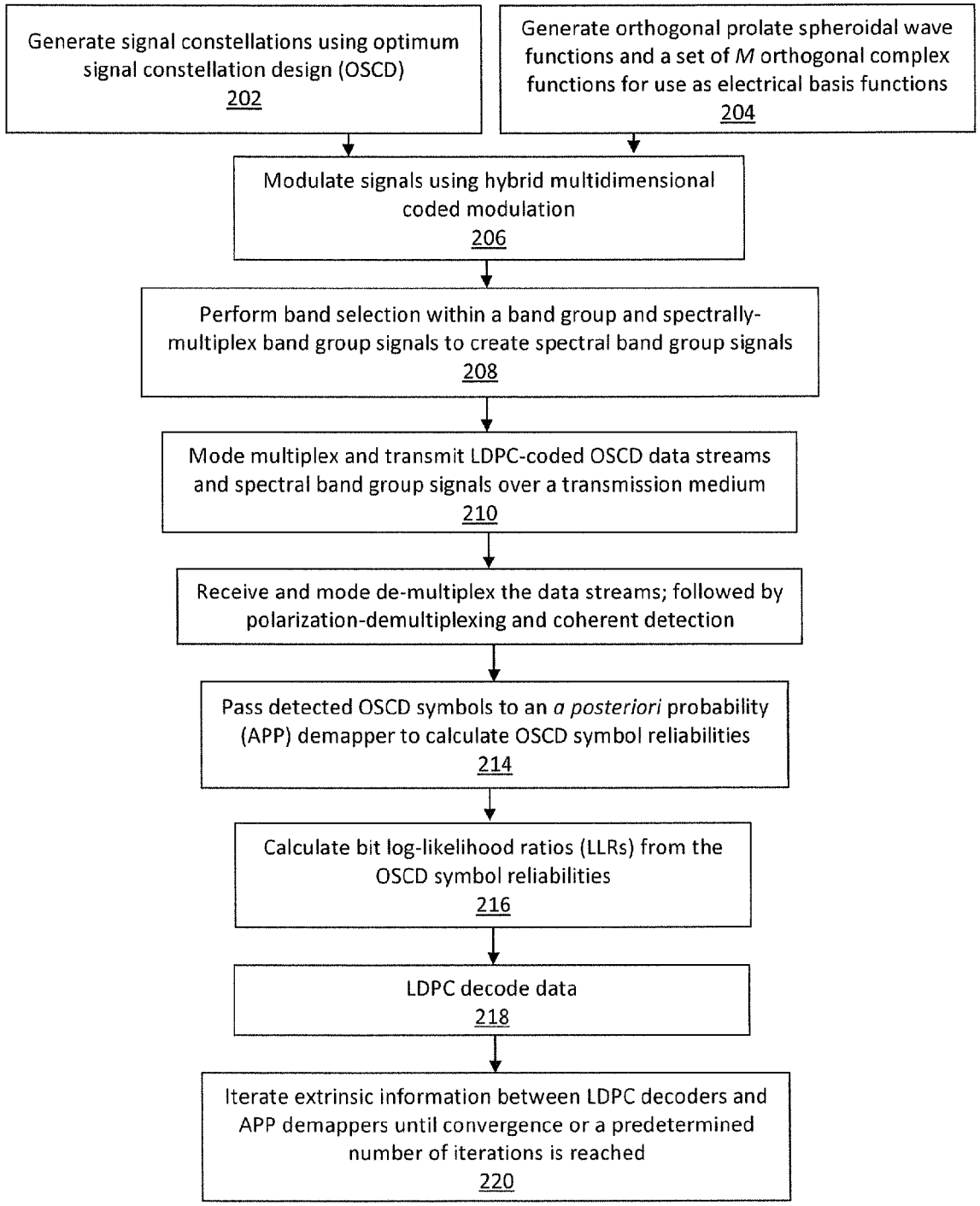
FIG. 2 shows a block/flow diagram illustrating a system/method for data transport using hybrid multidimensional coded-modulation employing orthogonal prolate spheroidal wave functions according to the present principles.

Referring now to FIG. 2, a system/method for data transport using hybrid multidimensional coded-modulation employing orthogonal prolate spheroidal wave functions is illustratively depicted according to the present principles. In one embodiment, signal constellations are generated using optimum signal constellation design (OSCD) in block 202. OSCD may be employed for ultra-high speed serial transmission (e.g., beyond 400 Gb/s) using a polarization division multiplexed (PDM) coded-modulation scheme based on signal constellations obtained by minimization of the mean-square error (MSE) of signal constellations representing the source for the optimum source distribution.

In one embodiment, the optimum source distribution may be obtained by maximizing the channel capacity, based on the Arimoto-Blahut algorithm for a given finite-input finite-output channel. The Arimoto-Blahut algorithm may be employed to iterate probability mass functions to achieve convergence and optimum source distribution. Therefore, these signal constellations are optimum in the minimum MSE (MMSE) sense, and the method formulated in accordance with the present principles is thus named the MMSE-optimum signal constellation design (OSCD) method.

The OSCD-based constellations may be channel capacity achieving signal constellations, and may be combined with Low Density Parity Check (LDPC) codes of high girth (e.g., girth-8, girth-10, etc.). The constellations obtained by Cartesian products of existing 1-D and 2-D constellations can be used as well. Additionally, the constellations obtained by sphere-packing method can also be used in combination with a hybrid coded-modulation scheme in accordance with the present principles. In one embodiment, signal constellation sizes that are not a power of two are employed to improve the tolerance to either in-phase/quadrature (I/Q) imbalance or polarization crosstalk due to imperfectly compensated PMD. The signal constellation may be decomposed into two sub-constellations corresponding to in-phase and quadrature channels.

As sub-constellations may belong to the same parent constellation in the presence of I/Q imbalance, the corresponding points do not overlap. For example, in a 96-ary constellation, 64 points may be allocated to the in-phase channel, and the remaining 32 points may be allocated to the quadrature channel (or vice versa).

The signals may then be modulated using hybrid multidimensional coded modulation in block 206, and both electrical and optical degrees of freedom may be employed. The optical degrees of freedom may include the polarization and spatial modes in few mode fibers (FMFs). Orthogonal prolate spheroidal wave functions (OPSWs) and a set of M orthogonal complex functions may be generated and employed as electrical basis functions in block 204, and may be provided as input to hybrid multidimensional coded modulation in block 206. In one embodiment, the pulse duration of the OPSWs remains unchanged for all orders, and the bandwidth remains the same (or nearly the same) regardless of the order value. These properties make OPSWs highly suitable for optical telecommunication applications.

In one embodiment, by using M orthogonal polynomials as basis functions in both in-phase and quadrature channels, in combination with two orthogonal polarization states and N orthogonal spatial modes, multi-Tb/s serial optical transport over several thousand km can be achieved by using single-carrier only and commercially available electronics, and may simultaneously solve the limited bandwidth and high energy consumption problems of information infrastructure. In another embodiment, instead of 2M OPSWs, a set of M orthogonal complex functions can be used as basis functions.

Band selection within a band group may be performed, and band group signals may be spectrally-multiplexed to create spectral band group signals in block 208. One or more independent LDPC-coded OSCD data streams and one or more spectral band group signals may be mode-multiplexed and transmitted over a transmission medium (e.g., FMF, FCF, etc.) in block 210. The data streams may be received and mode demultiplexed in block 212, which may be followed by coherent detection by employing, for example, polarization diversity receivers. After compensation of optical channel impairments, detected OSCD symbols may be passed to an a posteriori probability (APP) demapper, and OSCD reliabilities may be calculated in block 214. Bit log-likelihood ratios (LLRs) may be calculated from the OSCD symbol reliabilities in block 216, and LDPC decoding may be performed by one or more LDPD decoders in block 218. Extrinsic information may be iterated between LDPC decoders and APP demappers until either convergence or until a pre-determined number of iterations has been reached in block 220.

In one embodiment, the system and method is flexible, and may be used in a plurality of configurations, including, for example, multiplexing of 2N 2M-dimensional signals to fully 4MN-dimensional signaling. To improve the tolerance to iterative quadrature (I/Q) imbalance, signal constellations that are not a power of two may be employed. The signal constellation may be decomposed into two sub-constellations corresponding to in-phase and quadrature channels. Since sub-constellations belong to the same parent constellation in the presence of I/Q imbalance the corresponding points do not overlap.

In one embodiment, the band selection within the band-group is performed by complex multiplication with exp $(j2\pi f_n t)$ term, where $f_n$ is the center frequency of the n-th band in band-group. Such obtained signals are initially spectrally-multiplexed to create the spectral band group, and an all-optical OFDM approach may be used for spectral-multiplexing. In another embodiment, the spectral multiplexing can be achieved by the complex multiplication of corresponding 2M-dimensional signals by $\exp[j2\pi(f_c+f_n)t]$, where $f_c$ is the central frequency of the c-th spectral band group and a power coupler. The corresponding spectral band-group signals may then be coupled into FMF by a mode-multiplexer.

While the above system and method of data transport has been illustratively depicted as employing OSCD, an optical transmission medium, and particular types of dimensional splitting it is noted that other sorts of constellation designs, transmission media, and dimensional splitting may also be employed according to the present principles.

Figure 3:
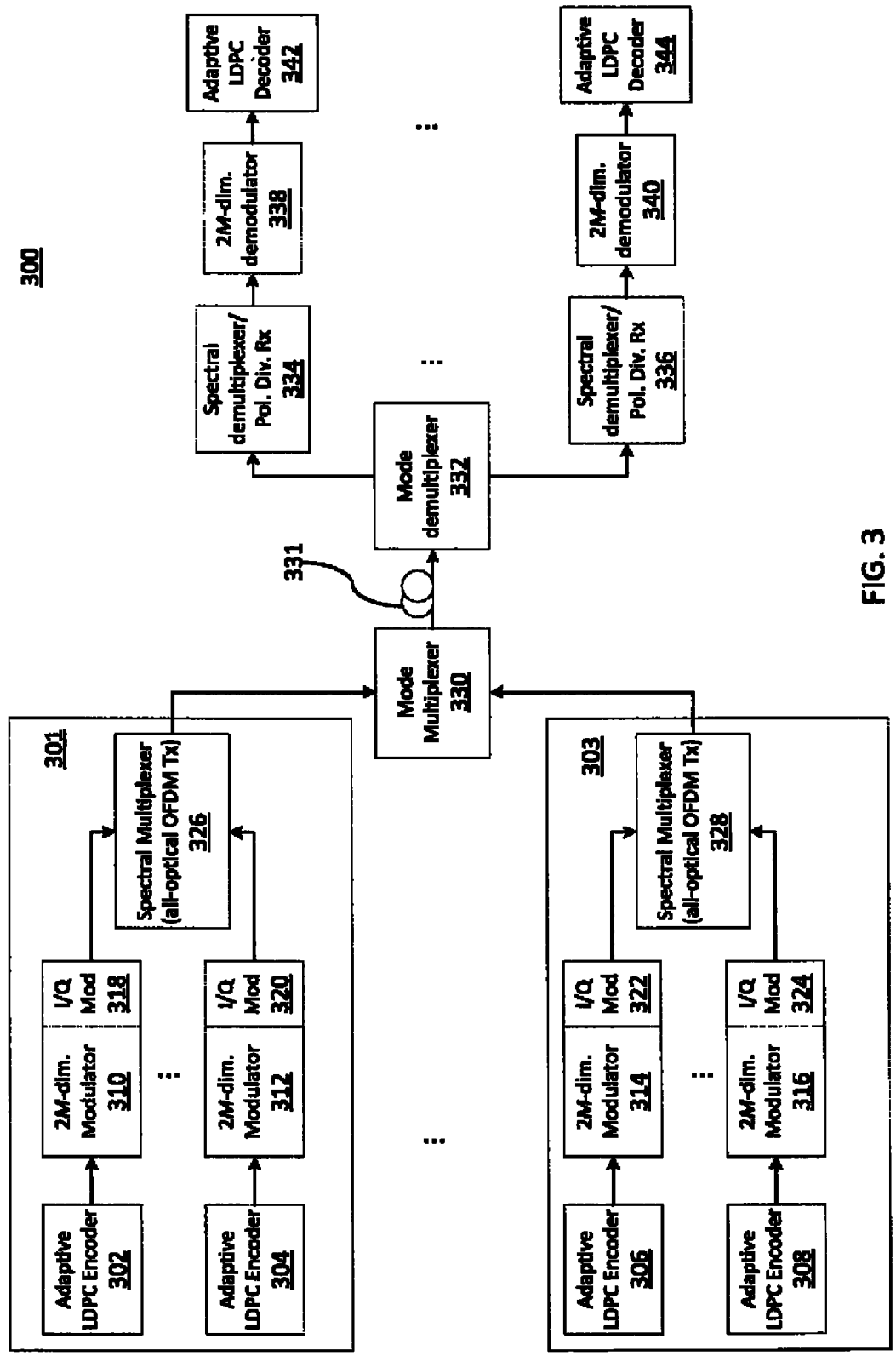
FIG. 3 shows a block/flow diagram illustrating a system/method for data transport including an adaptive coded multiband optical-orthogonal frequency division multiplexer (OFDM) with spatial-multiple-input and multiple-output (MIMO) processing according to the present principles.

Referring now to FIG. 3, a system/method for data transport including an adaptive coded multiband optical-orthogonal frequency division multiplexer (OFDM) with spatial-multiple-input and multiple-output (MIMO) is illustratively depicted according to the present principles. For simplicity, only a single polarization state is shown. In one embodiment, a plurality of spectral band groups 301, 303 are employed according to the present principles. One or more adaptive low density parity check (LDPC) encoders 302, 304, 306, 308 may encode data, and may pass the LDPC encoded data to one or more 2M-dimensional modulators 310, 312, 314, 316 and one or more inphase/quadrature (I/Q) modulators 318, 320, 322, 324. Spectral multiplexing may be performed by one or more spectral multiplexers on the transmitter side (e.g., all-optical OFDM Tx) 326, 328, and the spectrally multiplexed signal may be mode multiplexed in block 330 and transmitted over a transmission medium 331.

The signal may be received by a mode demultiplexer 332 and may be spectrally demultiplexed using one or more spectral demultiplexers and/or polarization division receivers 334, 336. The signal may be demodulated by one or more demodulators (e.g., 2M-dimensional demodulator) 338, 340, and may be decoded by one or more adaptive LDPC decoders 342, 344.

Figure 4:
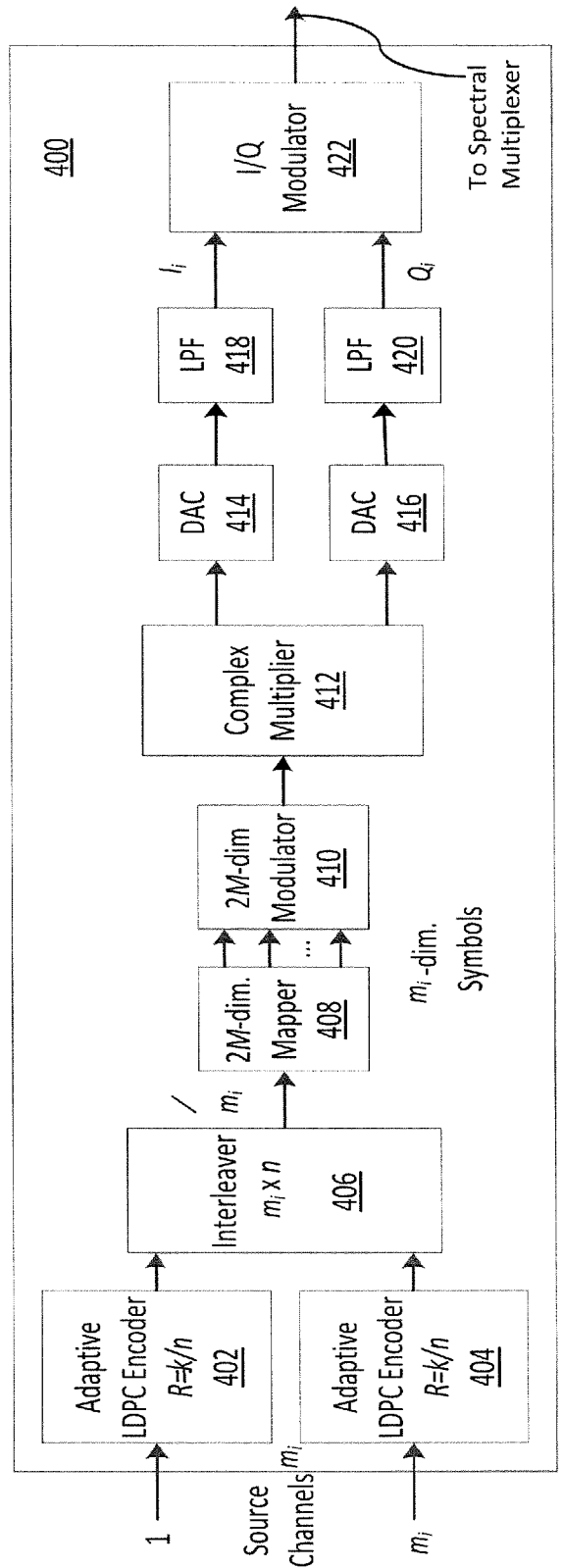
FIG. 4 shows a block/flow diagram illustrating a detailed representation of an adaptive low density parity check (LDPC)-coded 2M-dimensional electro-optical (E/O) modulator according to the present principles.

Referring now to FIG. 4, a detailed representation of an adaptive low density parity check (LDPC)-coded 2M-dimensional electro-optical (E/O) modulator is illustratively depicted according to the present principles. In one embodiment, a transmitter 401 including one or more adaptive LDPC encoders 402, 404, one or more interleavers 406, one or more 2M-dimensional mappers 408, one or more 2M-dimensional modulators 410, one or more complex multipliers 412, one or more digital to analog converters (DACs) 414, 416, one or more low pass filters (LPFs), and one or more inphase/quadrature (I/Q) modulators 422.

Data streams may be encoded using the LDPC codes in blocks 402 and 404. The codewords generated by LDPC encoders may be written in row-wise fashion into one or more corresponding interleavers 406. The bits at a particular time instance i may be taken from the interleaver in column-wise fashion and used as the input of corresponding 2M-dimensional mapper 408, and may be implemented as a look-up table (LUT). The coordinates from the mapper 408 may be used as input to the 2M-dimensional modulator 410. In one embodiment, the LDPC encoders 402, 404 and interleaver 406 may be replaced by a single nonbinary LDPC encoder (not shown). The independent adaptive irregular QC-LDPC-coded data streams may be written into a $m_i \times n$ (i∈{x,y}) block-interleaver 406. The $m_i$ bits from block-interleaver are taken column-wise and used to select the coordinates of a 2M-dimensional signal constellation.

Figure 5:
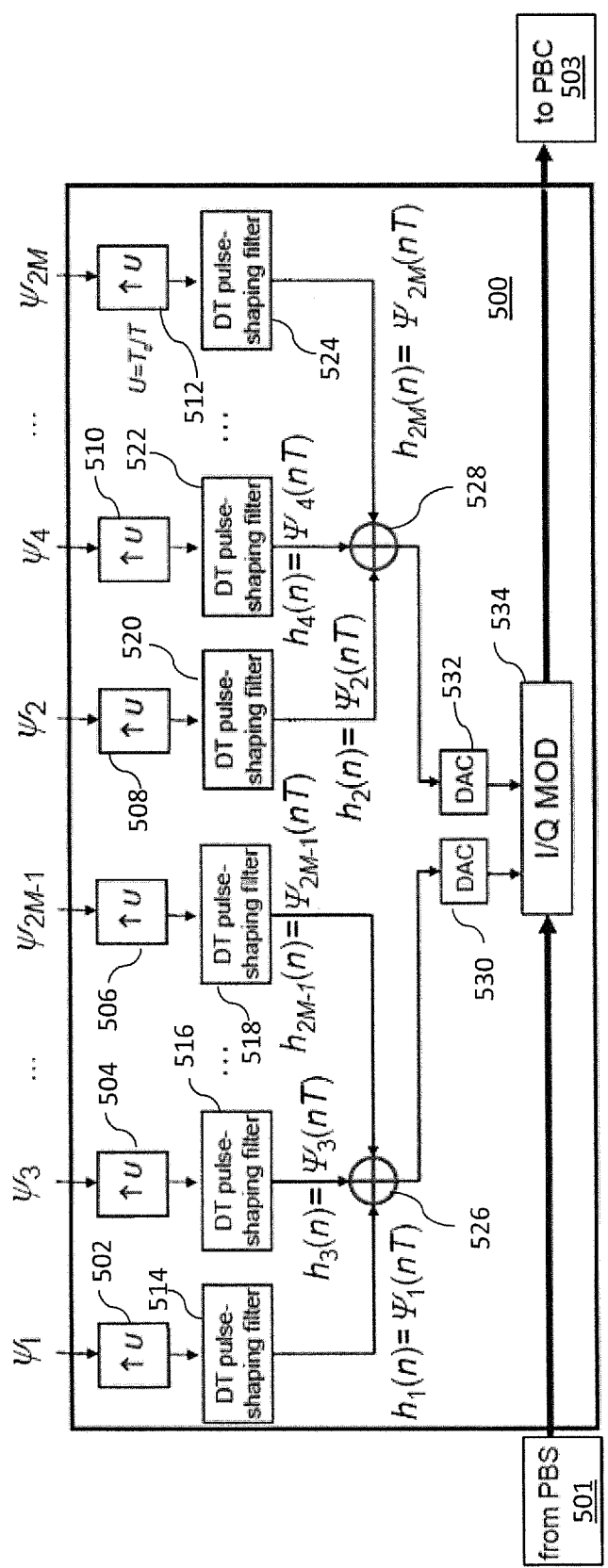
FIG. 5 shows a block/flow diagram illustrating a detailed representation of a 2M-dimensional modulator according to the present principles.

Referring now to FIG. 5, a detailed representation of a 2M-dimensional modulator is illustratively depicted according to the present principles. In one embodiment, a laser signal followed by a PBS 501, may be modulated using an I/Q modulator 434, and the modulated data may be passed to a PBC 503. The even/odd coordinates of a 2M-dimensional signal constellation may be up-sampled in blocks 502, 504, 506, 508, 510, and 512, and after up-sampling may be passed through corresponding DT pulse-shaping filters 514, 516, 518, 520, 522, 524 of impulse responses $h_i(n)$ (i=1, 2 . . . , 2M), whose outputs may be combined together into a single real data stream representing the in-phase/quadrature signal in blocks 526 and 528. After digital-to-analog conversion (DAC) in blocks 530 and 532, the corresponding in-phase and quadrature signals may be employed as inputs to the I/Q modulator 534, and the data may be passed to a PBC in block 503.

In one embodiment, the outputs of the pulse shaping filters 514, 516, 518, 520, 522, 524 are combined together into a single real (or imaginary) data stream representing in-phase (or quadrature) signals. After digital-to-analog conversion (DAC) in blocks 530, 532, the corresponding in-phase and quadrature signals are used as inputs to I/Q modulator (not shown). The 2M-dimensional modulator, shown in FIG. 4 in detail, may generate the signal constellation points as follows: $s_i = \sum_{d=0}^{2M-1} \psi_{i,d} \Psi_d$, where $\psi_{i,d}$ denotes the d-th coordinate (d=0, 1, 2, . . . , 2M−1) of the i-th signal-constellation point, and the set $\{\Psi_d\}$ denotes the set of basis functions: M orthogonal polynomials correspond to in-phase channel, while M orthogonal polynomials correspond to quadrature channel.

For example, the pulse duration of the orthogonal prolate spheroidal wave functions (OPSWs) stays unchanged for all orders, while the bandwidth stays almost the same regardless of the order value. Namely, the OPSWs are simultaneously time-limited to symbol duration T and bandwidth-limited to band Ω, and can be obtained as solutions of the following integral equation $$\int_{-T/2}^{T/2} \Psi_n(u) \frac{\sin\Omega(t-u)}{\pi(t-u)} du = \lambda_n \Psi_n(t), \lambda_n \in (0, 1),$$

where the coefficient $\lambda_n$ is related to the energy concentration in the interval [−T/,T/2]. The OSPWs satisfy double-orthogonality principle:

$$\int_{-T/2}^{T/2} \Psi_n(u) \Psi_m(u) du = \lambda_n \delta_{nm}, \int_{-\infty}^{\infty} \Psi_n(u) \Psi_m(u) du = \delta_{nm},$$

and as such these functions are very suitable for the optical telecommunication applications.

Alternatively, in another embodiment, the set of M complex orthogonal polynomials can be used instead of set of 2M real orthogonal polynomials. The principle orthonormality, for complex polynomials, is given by $$\int \Psi_n(z) \Psi_m^*(z) d\mu(z) = \begin{cases} 1, & n = m \\ 0, & n \neq m \end{cases},$$

where ∥(•) is a positive Borel measure in a complex plane. As an illustration, the orthonormal polynomials on a disk of radius R are given by $$\Psi_n(z) = \sqrt{\frac{n+1}{\pi R^2}} (z/R)^n$$

while the orthonormal polynomials on a curve of radius R are given by $\Psi_n(z) = (2\pi R)^{-1/2}(z/R)^n$. The coefficients in $s_i = \sum_{d=0}^{2M-1} \psi_{i,d} \Psi_d$ are now complex, and the real part corresponds to in-phase coordinate, while the imaginary part corresponds to quadrature component.

It is noted that although six up-samplers and DT pulse-shaping filters are illustratively shown, any number of up-samplers and DT pulse-shaping filters may be employed according to the present principles.

Figure 6:
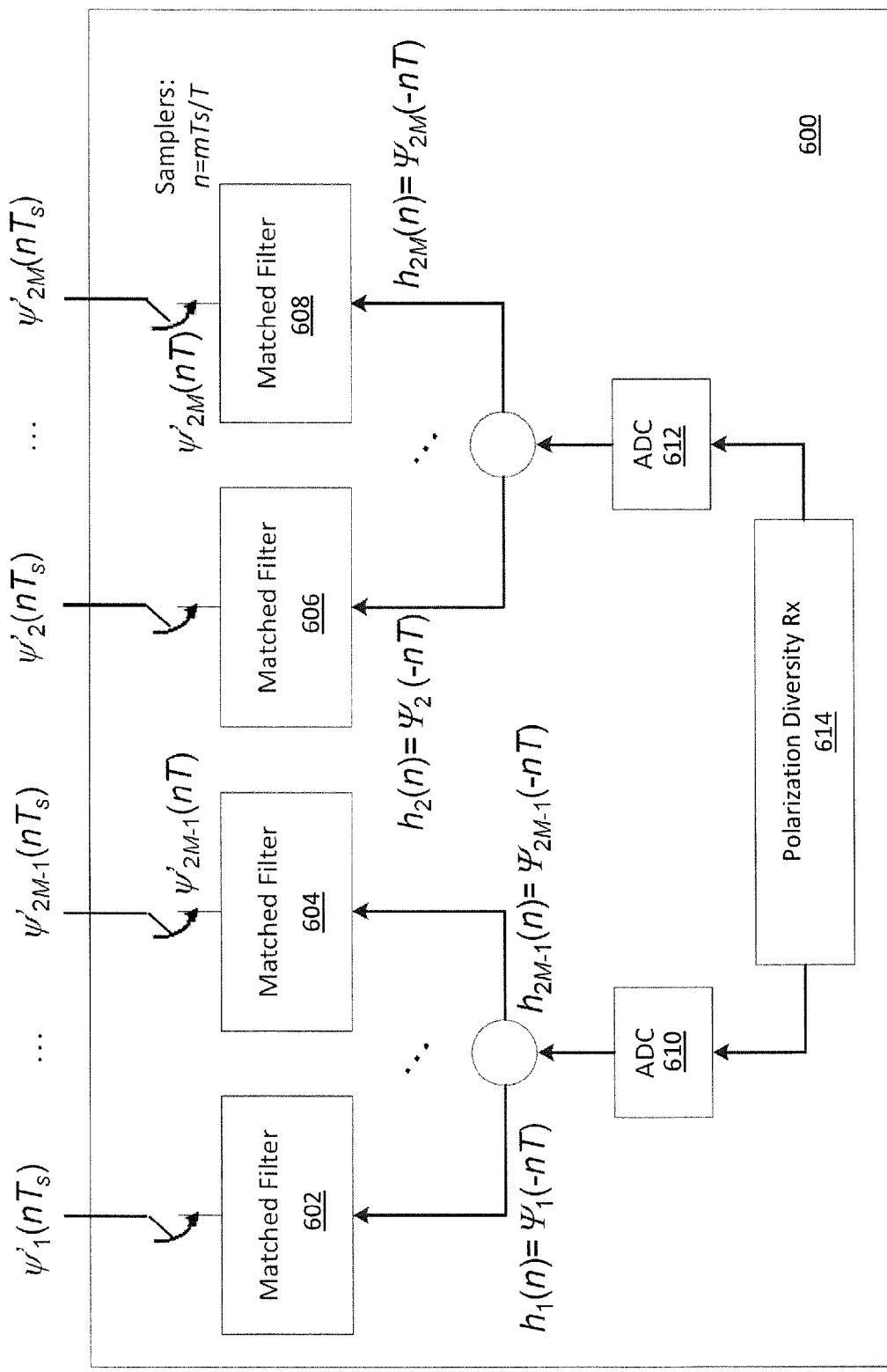
FIG. 6 shows a block/flow diagram illustrating a detailed representation of a 2M-dimensional demodulator according to the present principles.

Referring now to FIG. 6, a system/method for data transport including a 2M-dimensional demodulator 600 is illustratively depicted according to the present principles. In one embodiment, one or more signals may be received by a polarization diversity receiver 614, and two projections may be used as inputs for corresponding matched filters of impulse responses 602, 604, 606, 608 (e.g., $h_m(n) = \Phi_m(-nT)$), after analog-to-digital conversion (ADC) in blocks 610 and 612.

In one embodiment, on the receiver side, after mode-demultiplexing, every mode projection is forwarded to a polarization-diversity receiver 614, which provides the projections along the basis functions in both polarizations (and in-phase/quadrature channels). Each projection represents an M-dimensional electrical signal. Two M-dimensional projections (corresponding to x-/y-polarizations) are passed through analog-to-digital conversion (ADC) in blocks 610 and 612, and may be used as inputs to corresponding matched filters with impulse responses $h_m(n)=\Phi_m(-nT)$.

In one embodiment, re-sampling outputs represent projections along the corresponding basis functions, and these projections may be used as inputs to a multidimensional a posteriori probability (APP) demapper (not shown), which calculates symbol log-likelihood ratios (LLRs). The extrinsic information between LDPC decoders and APP demapper may be iterated until convergence is achieved, or until predetermined number of iterations has been reached. To compensate for the mode-coupling, optical MIMO detection principles may be employed.

In one embodiment, the rate-adaptive coding is employed in optically-routed networks so that different light wave paths can experience different penalties due to deployment of Reconfigurable Optical Add/Drop Multiplexers (ROADMs) and wavelength cross-connects, so that their optical signal to noise ratios (SNRs) can be quite different at the destination points. To provide seamless integrated transport platforms that can support heterogeneous networking, the error correction strength may be adjusted depending on the channel conditions. The code-rate adaptation in quasi-cyclic LDPC code design can be performed by selecting different number of block-rows in corresponding parity-check matrix (H-matrix).

The code rate adaptation may be performed by a partial reconfiguration of a decoder by changing the size of corresponding block-submatrix of H-matrix and/or by varying the number of employed block-rows while keeping codeword length intact. The aggregate data rate of the proposed scheme is given as $2(m_i+m_2)RR_sN_1N_2N_3$, where the factor two comes from two polarizations; R denotes the code rate, $R_s$ denotes the symbol rate, $N_1$ denotes the number of bands within the spectral group, $N_2$ denotes the number of spectral groups, and $N_3$ denotes the number of spatial bands. It is noted that the above principles also apply for modulators and demodulators for complex basis functions according to the present principles.

For example, an OSCD signal constellation of size Q may be decomposed into two sub-constellations of sizes $Q_i$ (i=1, 2) such that $Q=Q_1+Q_2$. The first (second) incoming $m_1$ ($m_2$) bits may be used to select the points from $Q_1=2^{m1}$-ary ($Q_2=2^{m2}$-ary) sub-constellation. Two sub-constellations may be associated with in-phase and quadrature channels. One purpose of the constellation decomposition is to add more flexibility to the adaptive modulation and coding as the constellation sizes that are not power of two can be used, which may allow finer granulation of aggregate data rate. For instance, the aggregate data rate of 24-ary constellation may be $2(m_1+m_2) RR_sN_1N_2N_3=2\times(\log_2 16+\log_2 8)\times0.8\times36$ GS/s$\times5\times5\times5=50.4$ Tb/s, which compatible with 50 TbE.

Figure 7:
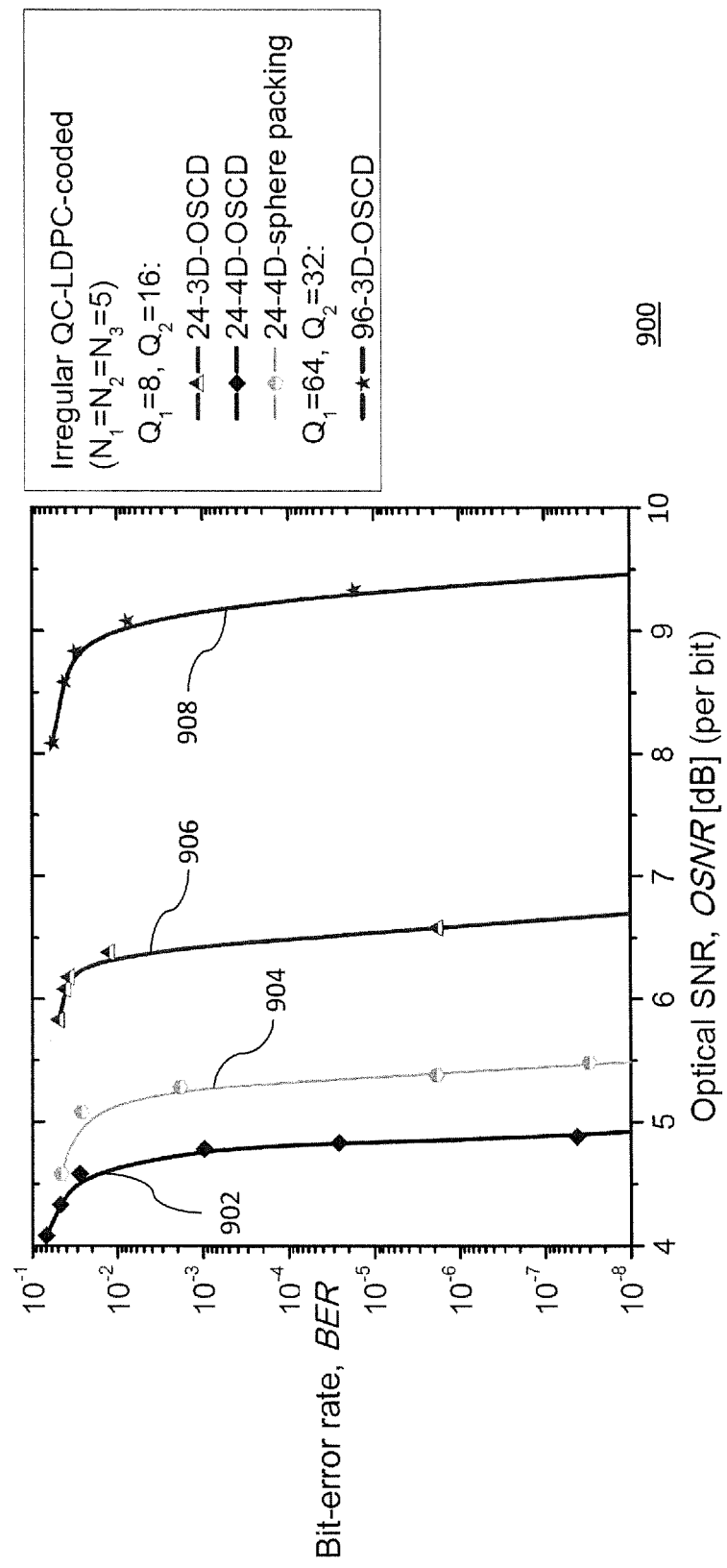
FIG. 7 shows plots of bit error rate (BER) versus optical signal to noise ratio (OSNR) for performance of hybrid multidimensional coded-modulation employing orthogonal prolate spheroidal wave functions according to the present principles.

Referring now to FIG. 7, plots of bit error rate (BER) versus optical signal to noise ratio (OSNR) (per bit) for performance of hybrid multidimensional coded-modulation employing orthogonal prolate spheroidal wave functions 900 are illustratively depicted according to the present principles. In one embodiment, Monte Carlo simulations were performed for an amplified spontaneous emission (ASE) noise dominated scenario, for information symbol rate of 36 GS/s ($N_1=N_2=N_3=5$), and for irregular QC LDPC (28180,21135) code of girth-8 and average column weight of 4. The results of simulations are shown for 5 outer (APP demapper-LDPC decoders) iterations and 20 LDPC decoder iterations. The signal constellations may be obtained by an OSCD method.

To improve the tolerance to I/Q imbalance, the signal constellation sizes that are not power of two may be employed. The 24-ary (902, 904, 906) and 96-ary (908) constellations are decomposed into two-sub constellations. The 16-points for 24-ary constellation are allocated to the in-phase channel, while remaining 8 are in quadrature channel. In a 96-ary constellation, 64 points are allocated to an in-phase channel, and the remaining 32 points to a quadrature channel. Since sub-constellations belong to the same parent constellation in the presence of I/Q imbalance, the corresponding points do not overlap.

The basis functions used in these constellations may be based on complex multiplication with $\exp(j2\pi f_n t)$ term, where $f_n$ is the center frequency of the n-th band in band-group. A similar strategy can be applied to deal with an imperfectly compensated mode-coupling. The 24-ary 4D-OSCD outperforms the corresponding constellation obtained by sphere-packing method (that is optimum when number of dimensions tends to infinity) by 0.6 dB. The spectral efficiency of 24-ary constellations is 7 bits/s/Hz/polarization/spatial mode. On the other hand, the spectral efficiency of 96-ary constellation is 11 bits/s/Hz/polarization/spatial mode. The aggregate data rate of 24-ary constellations when $N_1=N_2=N_3=5$ (and two polarizations) are used, and for symbol rate of 36 GS/s, is 50.4 Tb/s, while that of 96-ary constellation produces 79.2 Tb/s aggregate bit rate. Therefore, these schemes are suitable for beyond next generation optical transmission with ultra-high speed bit rates (e.g., bit rates exceeding 10 Tb/s).

Having described preferred embodiments of an optical data transport system/method including of hybrid multidimensional coded-modulation employing orthogonal prolate spheroidal wave functions (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for transmitting data, comprising:
  encoding one or more streams of input data using one or more adaptive Low Density Parity Check (LDPC) encoders, wherein the encoders
  generating one or more signal constellations;
  modulating one or more signals using hybrid multidimensional coded modulation;
  applying orthogonal prolate spheroidal wave functions as electrical basis functions;
  generating one or more spectral band group signals by selecting and combining two or more spectral band groups with center frequencies that are orthogonal to each other; and
  spectral-mode-multiplexing and transmitting the one or more adaptive LDPC-coded data streams including the one or more spectral band group signals combined into corresponding spatial modes over a transmission medium.

2. The method as recited in claim 1, further comprising:
  receiving and mode-demultiplexing the one or more adaptive LDPC-coded data streams including the one or more spectral band group signals followed by coherent detection by polarization diversity receivers and spectral demultiplexing;

calculating optimum signal constellation design (OSCD) symbol reliabilities using one or more a posteriori probability (APP) demappers;

adaptively LDPC decoding data using one or more adaptive LDPC decoders; and iterating extrinsic information between the adaptive LDPC decoders and the APP demappers until convergence or a predetermined number of iterations has been reached.

3. The method as recited in claim 1, wherein the hybrid multidimensional coded modulation employs both electrical and optical degrees of freedom.

4. The method as recited in claim 1, wherein the orthogonal prolate spheroidal wave functions are employed in both in-phase and quadrature channels in combination with two orthogonal polarization states and N orthogonal spatial modes.

5. The method as recited in claim 1, wherein the transmission medium is one or more of single-mode fiber (SMF), few-mode fiber (FMF), few-core fiber (FCF), and few-mode-few-core fiber (FMFCF).

6. The method as recited in claim 1, wherein the one or more signal constellations are decomposed into two sub-constellations, corresponding to in-phase and quadrature channels, for each of the one or more signal constellations.

7. The method as recited in claim 6, wherein corresponding points of each of the one or more signal sub-constellations do not overlap in constellation space.

8. The method as recited in claim 1, wherein the one or more signal constellations include one or more signal constellations with constellation sizes that are not a power of two to improve the tolerance to in-phase/quadrature (I/Q) imbalance and the tolerance to polarization crosstalk from imperfectly compensated polarization-mode dispersion (PMD).

9. The method as recited in claim 1, wherein the one or more signal constellations are generated using optimum signal constellation design (OSCD).

10. The method as recited in claim 1, wherein the spectral-mode-multiplexing is performed by complex multiplication of corresponding 2M-dimensional signals by $\exp[j2\pi(f_c+f_n)t]$, where $f_c$ is a central frequency of a c-th spectral band group while $f_n$ is the center frequency of the n-th band within the c-th group, and a power coupler.

11. A system for transmitting data, comprising:
one or more adaptive Low Density Parity Check (LDPC) encoders configured to encode one or more streams of input data;
a signal constellation generation module configured to generate one or more signal constellations;
one or more modulators configured to generate one or more signals using hybrid multidimensional coded modulation;
an orthogonal prolate spheroid wave function generation module configured to generate orthogonal prolate spheroid wave functions for use as electrical basis functions;
a spectral band group signal generation module configured to generate one or more spectral band group signals by selecting and combining two or more spectral band groups with center frequencies that are orthogonal to each other; and
one or more spectral-mode-multiplexers and transmitters configured to spectral-mode-multiplex and transmit one or more adaptive LDPC-coded data streams including the one or more spectral band group signals over a transmission medium.

12. The system as recited in claim 11, further comprising:
one or more receivers and mode-demultiplexers configured to receive and mode-demultiplex the one or more adaptive LDPC-coded data streams including the one or more spectral band group signals followed by coherent detection and spectral demultiplexing;
one or more a posteriori probability (APP) demappers configured to calculate OSCD symbol reliabilities;
one or more adaptive LDPC decoders configured to adaptively LDPC decode data; and
a feedback loop configured to iterate extrinsic information between the adaptive LDPC decoders and APP demappers until convergence or a predetermined number of iterations has been reached.

13. The system as recited in claim 11, wherein the hybrid multidimensional coded modulation employs both electrical and optical degrees of freedom.

14. The system as recited in claim 11, wherein the orthogonal prolate spheroidal wave functions are employed in both in-phase and quadrature channels in combination with two orthogonal polarization states and N orthogonal spatial modes.

15. The system as recited in claim 11, wherein the transmission medium is one or more of single-mode fiber (SMF), few-mode fiber (FMF), few-core fiber (FCF), and few-mode-few-core fiber (FMFCF).

16. The system as recited in claim 11, wherein the one or more signal constellations are decomposed into two sub-constellations, corresponding to in-phase and quadrature channels, for each of the one or more signal constellations.

17. The system as recited in claim 16, wherein corresponding points of each of the one or more signal sub-constellations do not overlap in constellation space.

18. The system as recited in claim 10, wherein the one or more signal constellations employed include one or more signal constellations with constellation sizes that are not a power of two to improve the tolerance to in-phase/quadrature (I/Q) imbalance and the tolerance to polarization crosstalk from imperfectly compensated polarization-mode dispersion (PMD).

19. The system as recited in claim 10, wherein the one or more signal constellations are generated using optimum signal constellation design (OSCD).

20. The system as recited in claim 10, wherein the spectral-mode-multiplexers are configured to perform spectral-mode-multiplexing by complex multiplication of corresponding 2M-dimensional signals by $\exp[j2\pi(f_c+f_n)t]$, where $f_c$ is a central frequency of a c-th spectral band group while $f_n$ is the center of the n-th band within the c-the band group, and a power coupler.

* * * * *